US008554007B2

(12) United States Patent
Hashimoto

(10) Patent No.: US 8,554,007 B2
(45) Date of Patent: Oct. 8, 2013

(54) IMAGE PROCESSING APPARATUS, IMAGE PROCESSING METHOD, AND COMPUTER-READABLE STORAGE MEDIUM FOR COMPUTER PROGRAM

(75) Inventor: Hideyuki Hashimoto, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 270 days.

(21) Appl. No.: 13/050,447

(22) Filed: Mar. 17, 2011

(65) Prior Publication Data
US 2011/0235906 A1    Sep. 29, 2011

(30) Foreign Application Priority Data
Mar. 23, 2010  (JP) ................................ 2010-066869

(51) Int. Cl.
*G06K 9/40*  (2006.01)
(52) U.S. Cl.
USPC ............... 382/266; 345/472.2; 348/333.09; 358/445; 382/154; 382/166; 382/239; 382/269; 382/299; 396/564; 712/32; 715/801
(58) Field of Classification Search
None
See application file for complete search history.

(56) References Cited

U.S. PATENT DOCUMENTS

| | | | | |
|---|---|---|---|---|
| 5,258,854 A | * | 11/1993 | Eschbach | 358/445 |
| 5,487,172 A | * | 1/1996 | Hyatt | 712/32 |
| 5,583,953 A | * | 12/1996 | Harrington | 382/239 |
| 5,953,464 A | * | 9/1999 | Harrington | 382/299 |
| 6,384,828 B1 | * | 5/2002 | Arbeiter et al. | 345/472.2 |
| 6,591,020 B1 | * | 7/2003 | Klassen | 382/269 |
| 7,177,465 B1 | * | 2/2007 | Takahira | 382/166 |
| 7,222,306 B2 | * | 5/2007 | Kaasila et al. | 715/801 |
| 7,912,323 B2 | | 3/2011 | Okuno et al. | |
| 8,224,069 B2 | * | 7/2012 | Nakajima | 382/154 |

(Continued)

FOREIGN PATENT DOCUMENTS

| | | |
|---|---|---|
| JP | 04-180176 A | 6/1992 |
| JP | 08-251416 A | 9/1996 |

(Continued)

OTHER PUBLICATIONS

Office Action (Notification of Reason(s) for Refusal) dated Feb. 28, 2012, issued in corresponding Japanese Patent Application No. 2010-066869, and an English Translation thereof. (5 pages).

(Continued)

*Primary Examiner* — Tsung-Yin Tsai
(74) *Attorney, Agent, or Firm* — Buchanan Ingersoll & Rooney PC

(57) ABSTRACT

An image processing apparatus includes a storage that stores, therein, edge position data indicating the position of a first edge image that represents a first edge of a first object image representing an object in a first image, a determination portion that detects a second edge image based on the edge position data and a specific scaling factor, the second edge image representing a second edge of a second object image that represents the object in a second image, the second image being obtained by modifying the size or the resolution of the first image by increasing the number of pixels by α times (α>1) corresponding to the scaling factor, the second edge having a width equal to that of the first edge, and a removal portion that performs a process for deleting an edge of an inner area surrounded by the second edge image.

5 Claims, 15 Drawing Sheets

(56) References Cited

U.S. PATENT DOCUMENTS

2003/0161628 A1* 8/2003 Ito et al. .................. 396/564
2008/0050032 A1* 2/2008 Okuno et al. ............. 382/266
2009/0295914 A1  12/2009 Sato et al.
2010/0182480 A1* 7/2010 Nakajima ............. 348/333.09

FOREIGN PATENT DOCUMENTS

| JP | 9-114922 A | 5/1997 |
| JP | 2000-261659 A | 9/2000 |
| JP | 2003-008889 A | 1/2003 |
| JP | 2006-235733 A | 9/2006 |
| JP | 2008-232933 A | 10/2008 |

OTHER PUBLICATIONS

Office Action (Notification of Reason(s) for Refusal) dated May 29, 2012, issued in corresponding Japanese Patent Application No. 2010-066869, and an English Translation thereof. (6 pages).

Office Action (Decision of Refusal) dated Jul. 31, 2012, issued in corresponding Japanese Patent Application No. 2010-066869, and an English Translation thereof. (7 pages).

* cited by examiner

| SURROUNDING PIXEL | SURROUNDING PIXEL | SURROUNDING PIXEL | SURROUNDING PIXEL | SURROUNDING PIXEL |
|---|---|---|---|---|
| SURROUNDING PIXEL | SURROUNDING PIXEL | SURROUNDING PIXEL | SURROUNDING PIXEL | SURROUNDING PIXEL |
| SURROUNDING PIXEL | SURROUNDING PIXEL | PIXEL OF INTEREST | SURROUNDING PIXEL | SURROUNDING PIXEL |
| SURROUNDING PIXEL | SURROUNDING PIXEL | SURROUNDING PIXEL | SURROUNDING PIXEL | SURROUNDING PIXEL |
| SURROUNDING PIXEL | SURROUNDING PIXEL | SURROUNDING PIXEL | SURROUNDING PIXEL | SURROUNDING PIXEL |

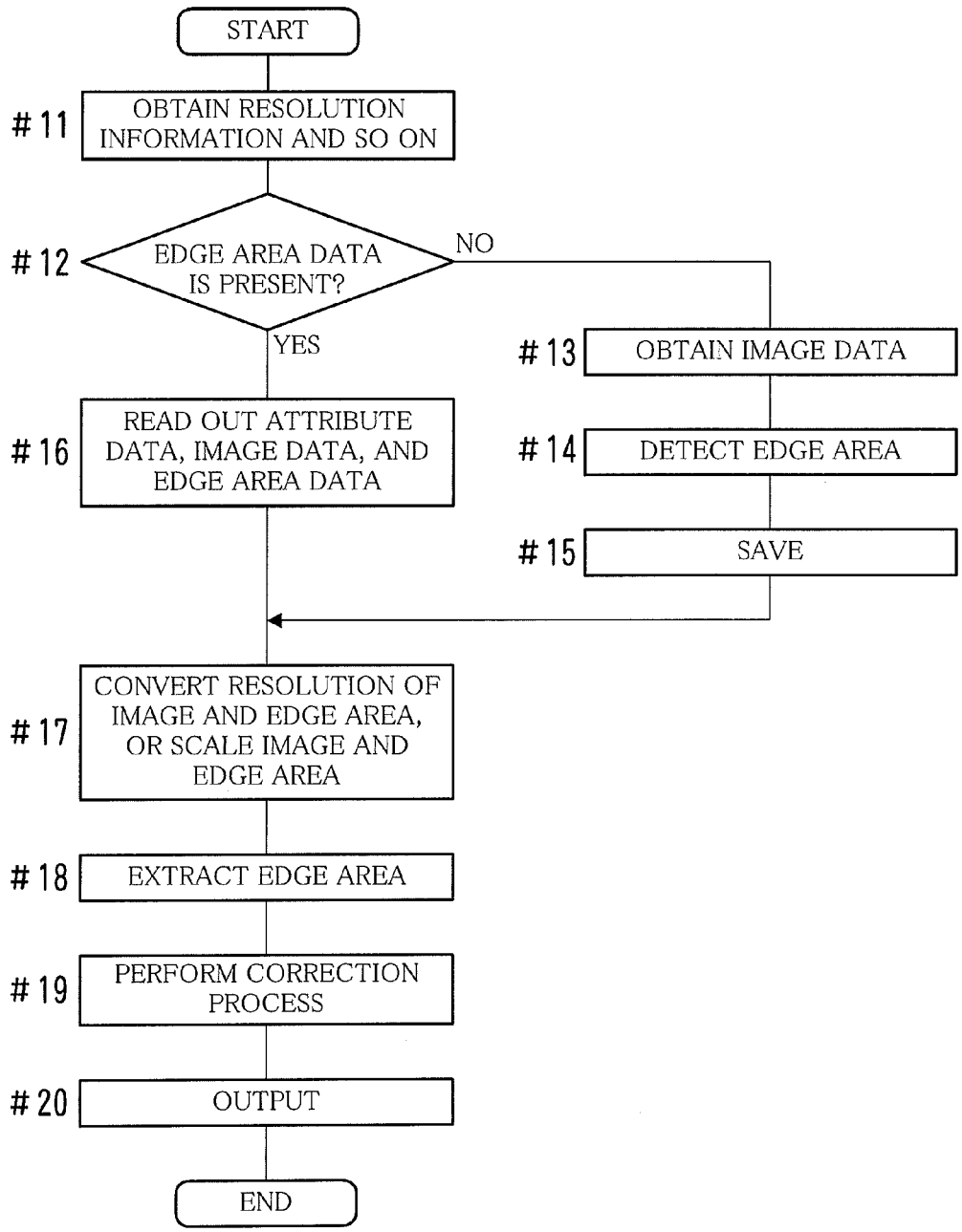

IMAGE PROCESSING APPARATUS, IMAGE PROCESSING METHOD, AND COMPUTER-READABLE STORAGE MEDIUM FOR COMPUTER PROGRAM

This application is based on Japanese patent application No. 2010-066869 filed on Mar. 23, 2010, the contents of which are hereby incorporated by reference.

BACKGROUND OF THE INVENTION

1. Field of the Invention

The present invention relates to an apparatus and method for performing image correction, and the like.

2. Description of the Related Art

Image forming apparatuses having a variety of functions, such as copying, PC printing, scanning, faxing, and file server, have recently come into widespread use. Such image forming apparatuses are sometimes called "multifunction devices", "Multi-Function Peripherals (MFPs)", or the like.

As the function of an image forming apparatus is extended, such an image forming apparatus is capable of obtaining an image in a variety of ways, performing processing on the image, and outputting the resultant image.

For example, such an image forming apparatus is capable of obtaining an image by scanning the image depicted on paper. The image forming apparatus can also obtain an image by receiving image data from a personal computer, or the like.

Further, the image forming apparatus can perform processing on an image in a manner to enhance an edge of an object such as a character or a picture contained in the image. The image forming apparatus can also enlarge an image or improve a resolution thereof. There is disclosed a method for correcting an edge part of a character to enhance the character (see Japanese Laid-open Patent Publication No. 09-114922). There is disclosed another method for determining whether each pixel in an image belongs to a character area or a photograph area (see Japanese Laid-open Patent Publication No. 2000-261659).

The image forming apparatus can print an image onto paper. The image forming apparatus can also transmit image data of an image to another device.

In the meantime, if a process for enlarging an image or a process for improving a resolution thereof is performed after edge enhancement, the number of pixels representing the width of an edge is increased. An edge is inherently to define a boundary between an object and another object in an image. Thus, modifying the width of an edge depending on the size of an object is almost worthless. On the contrary, in view of the appearance of the entire image, it is desirable that the width of an edge be constant independently of the size of an object as long as the object has at least a predetermined size.

SUMMARY

The present disclosure is directed to solve the problems pointed out above, and therefore, an object of an embodiment of the present invention is to improve the appearance of an edge of an object in an enlarged image or in an image whose resolution has been improved, as compared to the conventional techniques.

According to an aspect of the present invention, an image processing apparatus includes a storage that stores, therein, edge position data indicating a position of a first edge image, the first edge image representing a first edge of a first object image, the first object image representing an object contained in a first image, a determination portion that detects a second edge image based on the edge position data and a specific scaling factor, the second edge image representing a second edge of a second object image, the second object image representing the object contained in a second image, the second image being an image obtained by modifying a size or a resolution of the first image by increasing a number of pixels by α times corresponding to the specific scaling factor where α is greater than 1, the second edge having a width equal to a width of the first edge, and a removal portion that performs a process for deleting an edge of an inner area that is surrounded by the second edge image.

Preferably, the removal portion performs the process for deleting an edge on a common part of the inner area overlapping with an image obtained by increasing a number of pixels in the first edge image by said α times.

Alternatively, the removal portion performs the process for deleting an edge by changing attributes of colors of each pixel in the inner area to attributes of colors of a pixel having a lowest lightness value among all pixels in a predetermined region with said each pixel centered.

Yet alternatively, the removal portion performs the process for deleting an edge by correcting attributes of colors of each pixel in the common part in such a manner that a pixel closer to the second edge image has attributes approximated to attributes of colors of pixels in the second edge image, and a pixel farther from the second edge image has attributes approximated to attributes of colors of pixels surrounded by the common part.

According to another aspect of the present invention, an image processing apparatus includes a determination portion that detects an edge area for defining an edge of an object image, the object image representing an object contained in an image. And a correction portion that performs correction to increase a lightness value of each pixel on a periphery that has a predetermined width and is adjacent to an inner part of the edge area.

These and other characteristics and objects of the present invention will become more apparent by the following descriptions of preferred embodiments with reference to drawings.

BRIEF DESCRIPTION OF THE DRAWINGS

FIG. 7 is a diagram illustrating an example of an M×N filter.

FIG. 13 is a flowchart depicting an example of the overall processing flow of an image forming apparatus.

DESCRIPTION OF THE PREFERRED EMBODIMENTS

Figure 1:
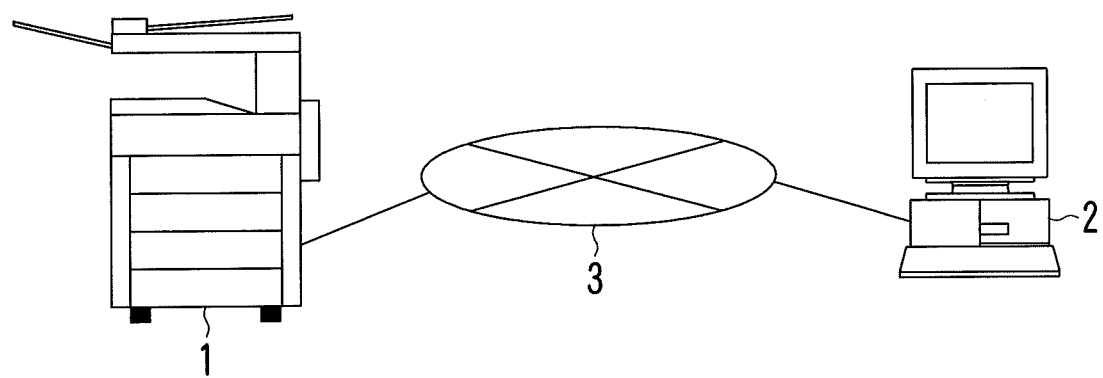
FIG. 1 is a diagram illustrating an example of the configuration of a network system including an image forming apparatus.
Figure 2:
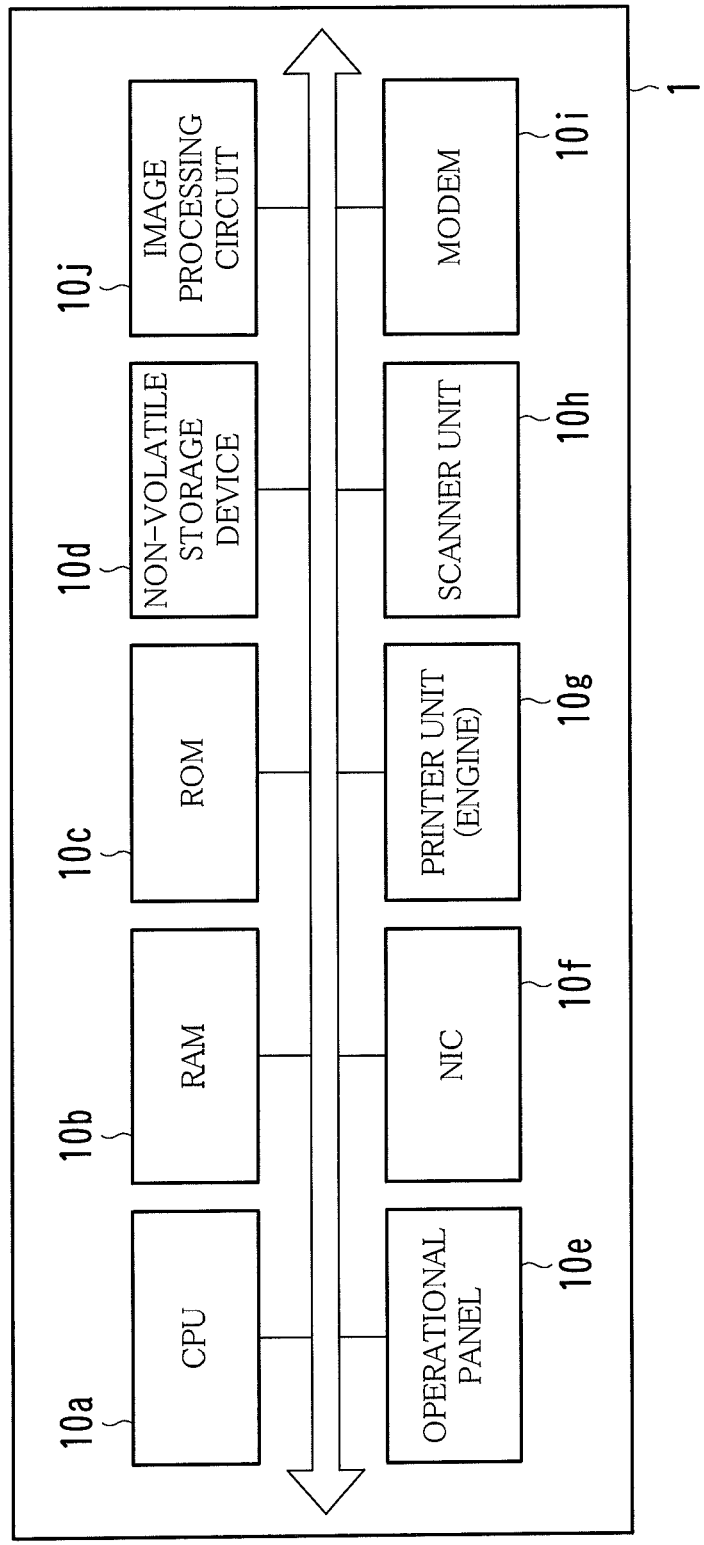
FIG. 2 is a diagram illustrating an example of the hardware configuration of an image forming apparatus.
Figure 3:
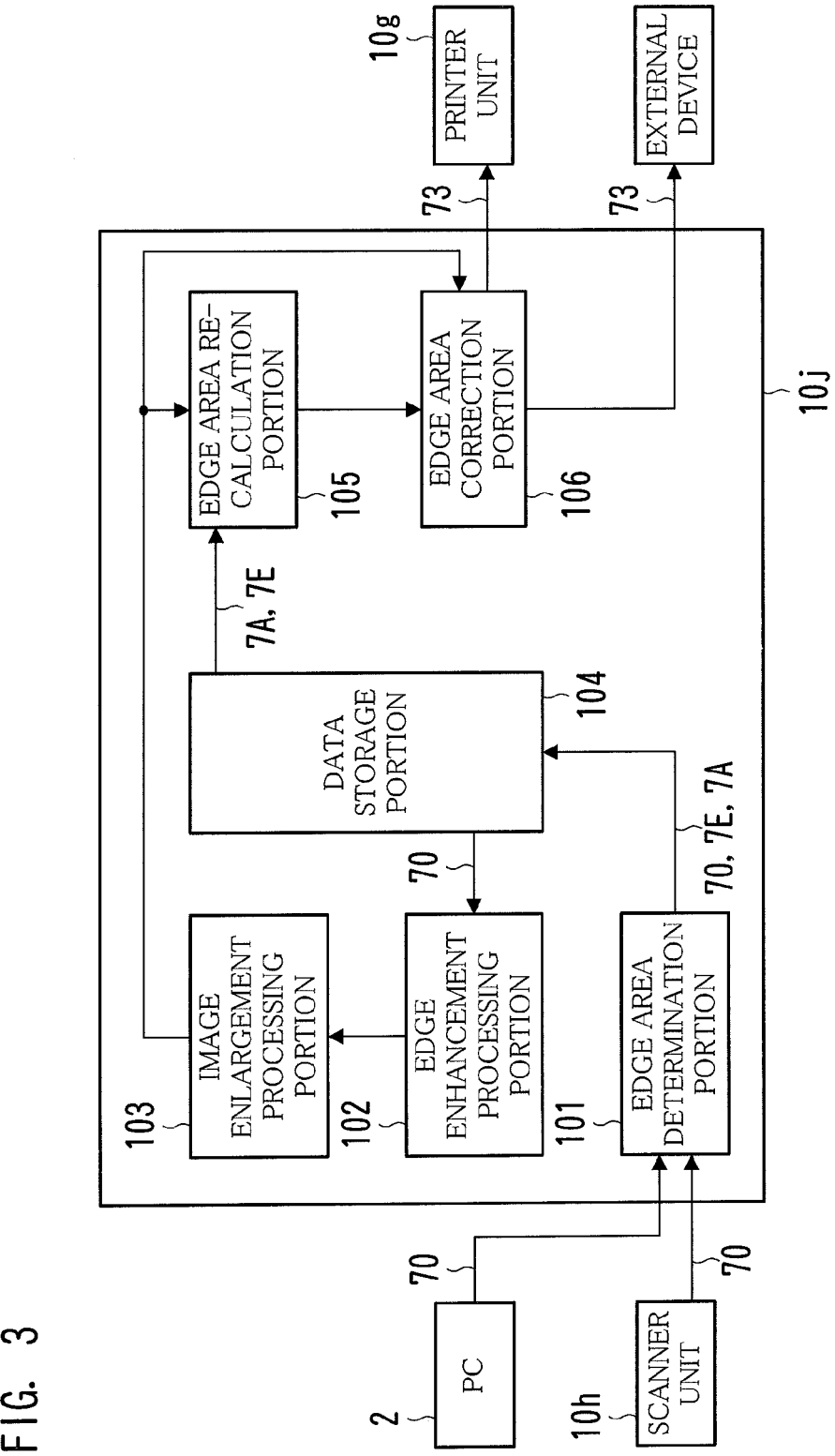
FIG. 3 is a diagram illustrating an example of the configuration of an image processing circuit.

FIG. 1 is a diagram illustrating an example of the configuration of a network system including an image forming apparatus 1; FIG. 2 is a diagram illustrating an example of the hardware configuration of the image forming apparatus 1; and FIG. 3 is a diagram illustrating an example of the configuration of an image processing circuit 10j.

The image forming apparatus 1 is an image processing apparatus generally called a multifunction device or a Multi Function Peripheral (MFP). The image forming apparatus 1 is a device that integrates a variety of functions, such as copying, PC printing (network printing), faxing, scanning, and so on, into a single unit.

The image forming apparatus 1 is connectable to another device such as a personal computer 2 via a communication line 3.

Referring to FIG. 2, the image forming apparatus 1 is configured of a Central Processing Unit (CPU) 10a, a Random Access Memory (RAM) 10b, a Read Only Memory (ROM) 10c, a non-volatile storage device 10d, an operational panel 10e, a Network Interface Card (NIC) 10f, a printer unit 10g, a scanner unit 10h, a modem 10i, an image processing circuit 10j, and so on.

The scanner unit 10h is a device that reads a document image configured of a photograph, a character, a picture, a chart, and the like depicted on paper, and creates image data thereof.

The image processing circuit 10j serves to perform image processing by using image data of an image obtained by the scanner unit 10h, or image data transmitted from the personal computer 2 or the like. This will be described later.

The printer unit log serves to print, onto paper, an image on which the image processing circuit 10j has performed image processing.

The operational panel 10e is configured of a touchscreen, a group of keys, and so on. The touchscreen displays, for example, a screen for giving a message to a user, a screen for the user to enter a command to be given to the image forming apparatus 1, and a screen for displaying the result of a process. The touchscreen also detects a position thereof touched by the user and informs the CPU 10a of the detected position. The group of keys includes a numeric keypad, a start key, and a stop key. The user operates the operational panel 10e to give a command to the image forming apparatus 1 or to enter data thereinto.

The NIC 10f serves to communicate with another device such as the personal computer 2 according to Transmission Control Protocol/Internet Protocol (TCP/IP) via a so-called Local Area Network (LAN), for example.

The modem 10i serves to communicate with another facsimile terminal via a fixed-line telephone network based on a protocol such as G3.

Examples of the non-volatile storage device 10d are a hard disk, a Solid State Drive (SSD), and a flash memory.

The ROM 10c or the non-volatile storage device 10d stores, therein, Operating System (OS) and programs such as firmware or application. These programs are loaded into the RAM 10b as necessary, and executed by the CPU 10a.

Referring to FIG. 3, the image processing circuit 10j is configured of an edge area determination portion 101, an edge enhancement processing portion 102, an image enlargement processing portion 103, a data storage portion 104, an edge area re-calculation portion 105, an edge area correction portion 106, and so on.

The edge area determination portion 101 through the edge area correction portion 106 are implemented by a circuit such as an Application Specific Integrated Circuit (ASIC) or a Field Programmable Gate Array (FPGA). Alternatively, the whole or a part of the functions of the edge area determination portion 101 through the edge area correction portion 106 is implemented by describing process steps of the functions in the form of program and causing the CPU 10a to execute the program.

The image processing circuit 10j has the configuration as discussed above, and serves to correct an edge of an object such as a character contained in an image. Hereinafter, the individual portions of the image processing circuit 10j shown in FIG. 3 are described by taking an example in which an image depicted on paper is enlarged and the enlarged image is copied onto a separate sheet of paper. The image depicted on paper is hereinafter referred to as a "document image 60".

Figure 4A:
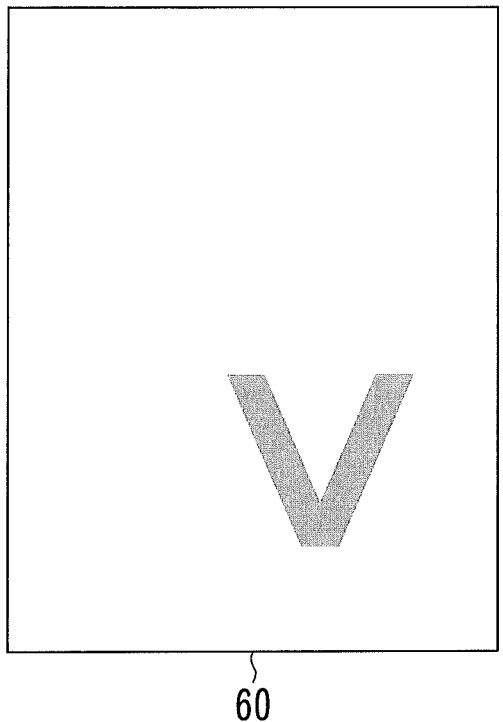
FIGS. 4A to 4C are diagrams illustrating an example of a document image, an edge image, and an edge-enhanced image, respectively.
Figure 4B:
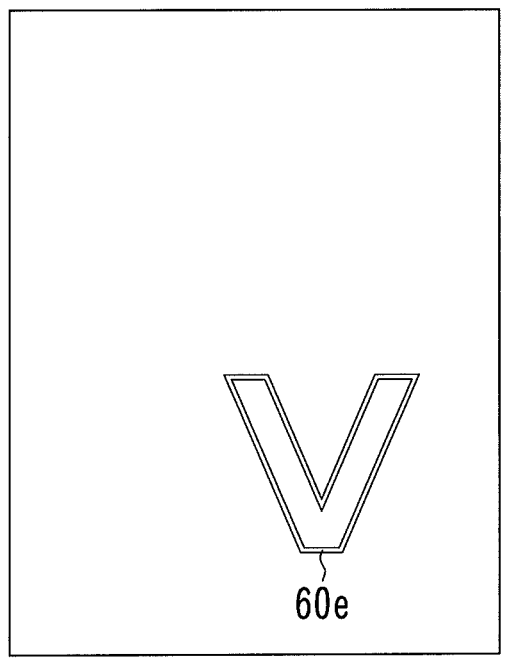
Figure 4C:
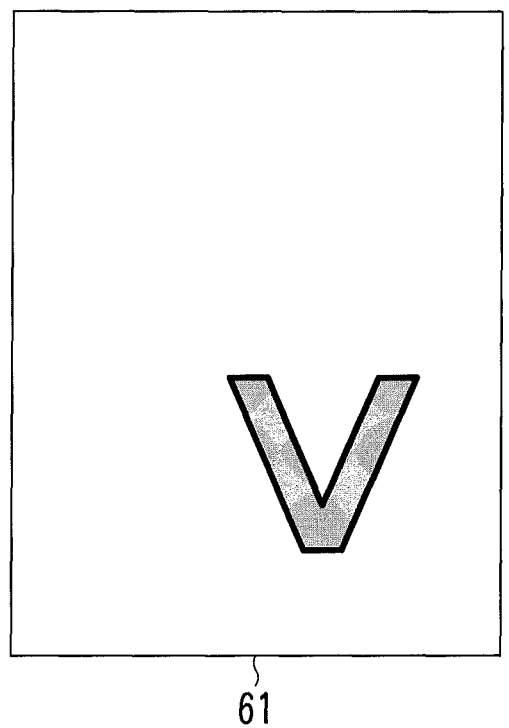
Figure 5:
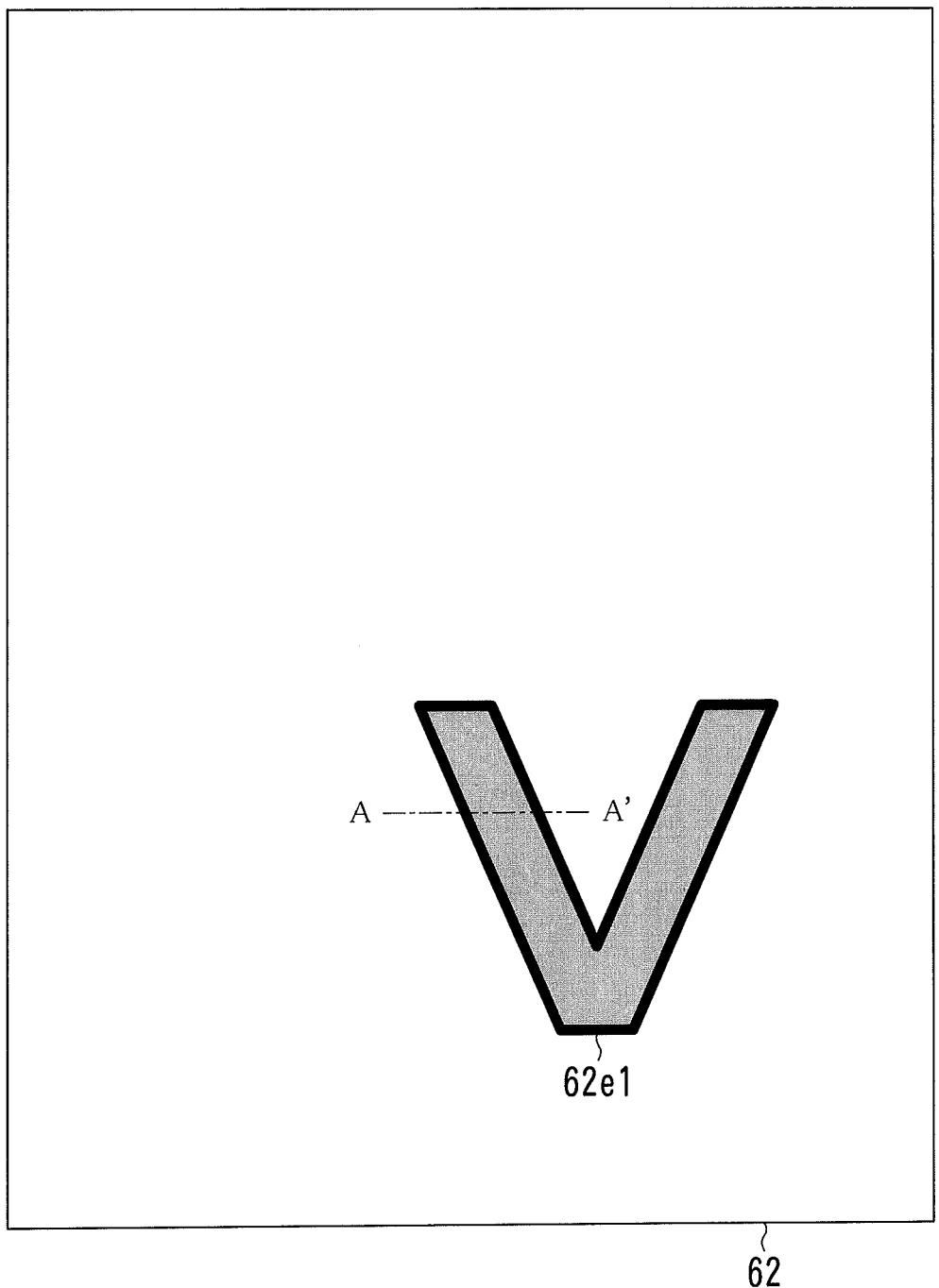
FIG. 5 is a diagram illustrating an example of an enlarged image.
Figure 6:
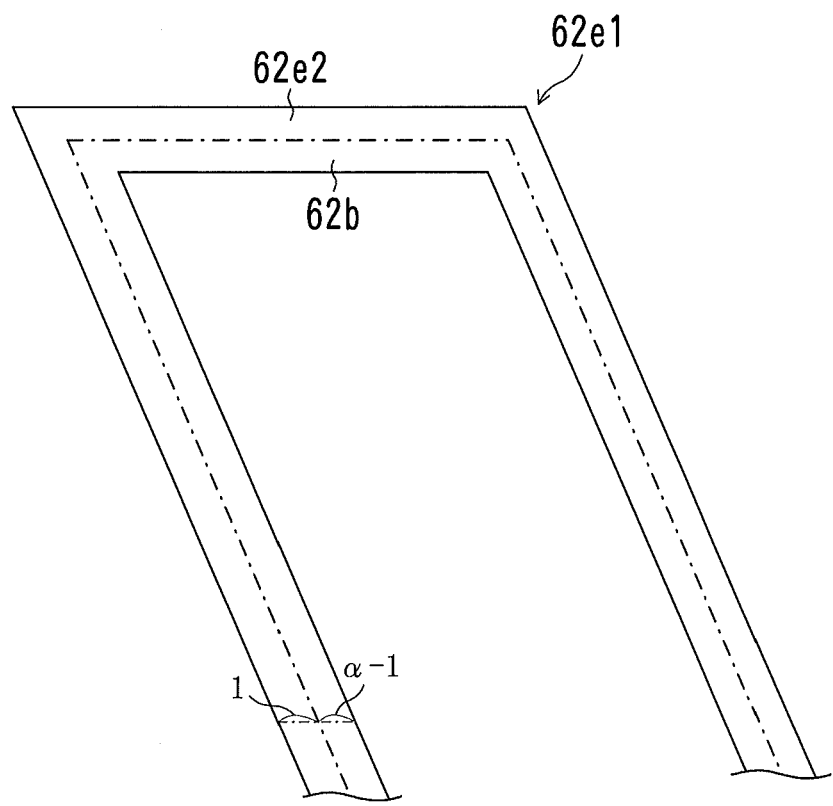
FIG. 6 is a diagram illustrating an example of a positional relationship between an edge and an expanded area.
Figure 8:
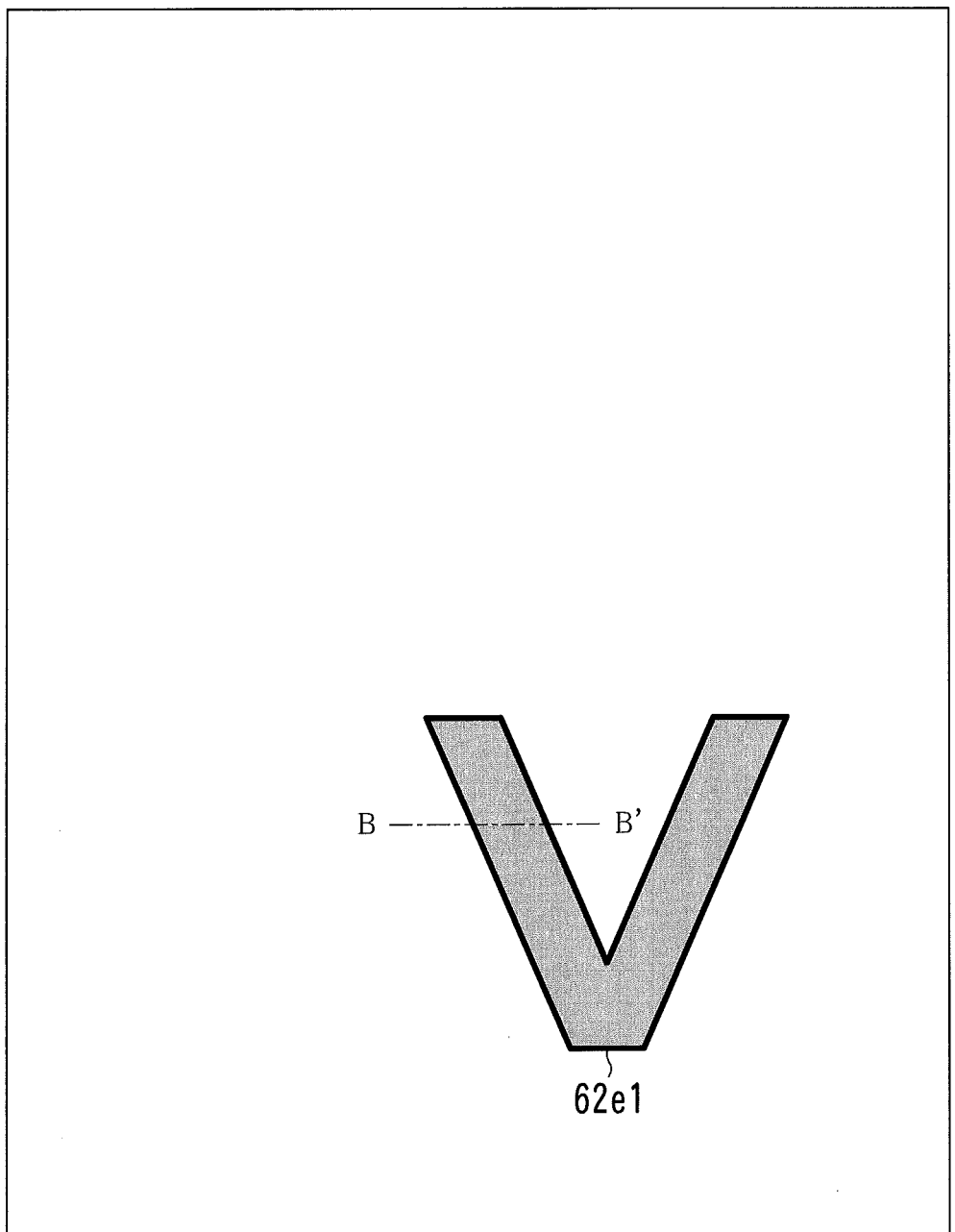
FIG. 8 is a diagram illustrating an example of a corrected enlarged image.
Figure 9:
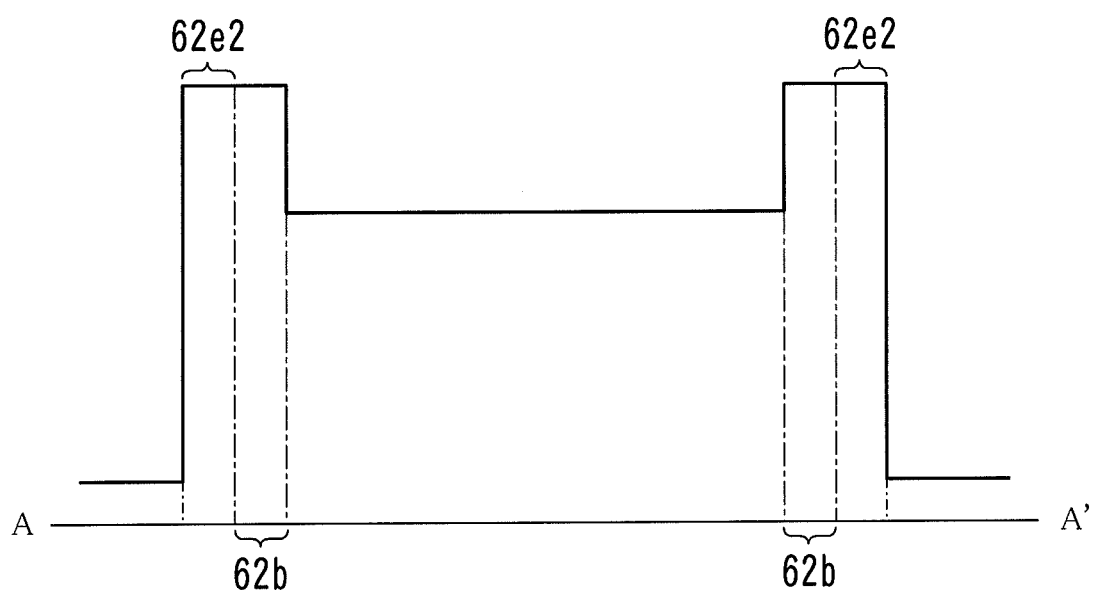
FIG. 9 is a diagram illustrating an example of density distribution of pixels in an object along the A-A' line of FIG. 5.
Figure 10:
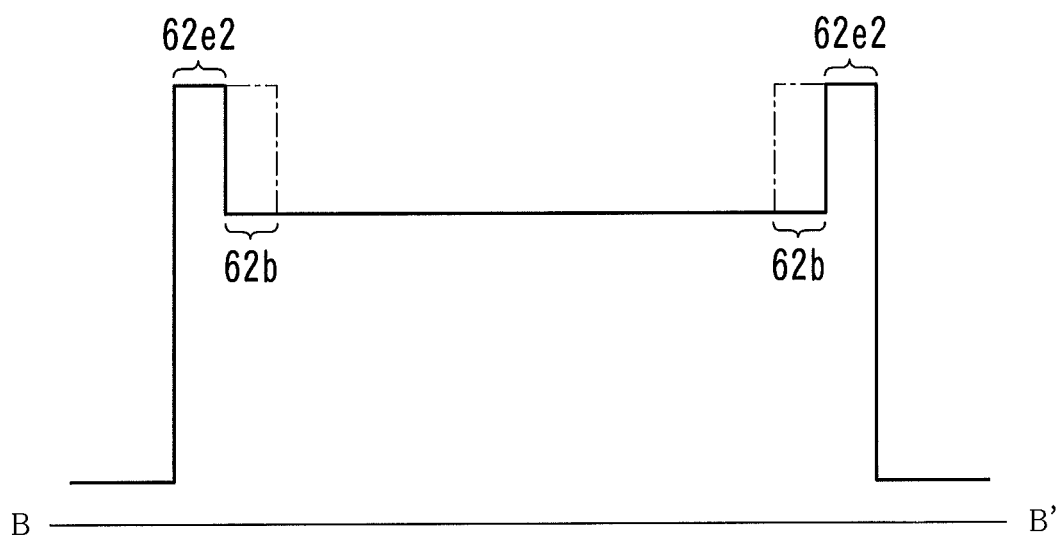
FIG. 10 is a diagram illustrating an example of density distribution of pixels in an object along the B-B' line of FIG. 8.

FIGS. 4A to 4C are diagrams illustrating an example of the document image 60, an edge 60e, and an edge-enhanced image 61, respectively; FIG. 5 is a diagram illustrating an example of an enlarged image 62; FIG. 6 is a diagram illustrating an example of a positional relationship between an edge 62e1, an edge 62e2, and an expanded area 62b; FIG. 7 is a diagram illustrating an example of an M×N filter; FIG. 8 is a diagram illustrating an example of a corrected enlarged image 63; FIG. 9 is a diagram illustrating an example of density distribution of pixels in an object along the A-A' line of FIG. 5; and FIG. 10 is a diagram illustrating an example of density distribution of pixels in an object along the B-B' line of FIG. 8.

The user places, onto a document glass of the scanner unit 10h, paper on which the original image 60 is depicted, and performs predetermined operation on the operational panel 10e. At this time, the user specifies an enlargement ratio and a scan resolution of an image. The user can also specify either a photograph mode or a character mode as a so-called document mode. In the case where neither the photograph mode nor the character mode is specified, the image forming apparatus 1 assumes that a default mode is specified as the document mode, and then, performs a copy process. The same is similarly applied to a scan resolution.

When the start button is pressed, the scanner unit 10h scans the document image 60 depicted on the paper placed on the document glass, and generates image data 70. The image data 70 is updated in accordance with a correction process on the document image 60 by the individual portions of the image processing circuit 10j of FIG. 3.

When the user specifies a predetermined scan mode, e.g., a scan mode other than the photograph mode, the edge area determination portion 101 detects an edge of a character contained in the document image 60, and generates edge area data 7E indicating the position of the edge. Note that, in this embodiment, an "edge" means a contour having a width corresponding to a few pixels in a certain object, e.g., a character, contained in an image.

Suppose that, for example, the document image 60 contains the character "V" as shown in FIG. 4A. In such a case, the edge area determination portion 101 detects an edge as exemplified in FIG. 4B. An edge of an object contained in the document image 60 is hereinafter referred to as an "edge 60e".

Alternatively, the image forming apparatus 1 is also capable of inputting the document image 60 by receiving image data of the document image 60 from the personal computer 2.

The data storage portion 104 stores, therein, image data 70, edge area data 7E, and attribute data 7A indicating the scan resolution and the number of pixels of the document image 60, as data of the document image 60.

The edge enhancement processing portion 102 serves to enhance a part of the edge 60e of the object contained in the document image 60, for example, by increasing the density. The document image 60 is corrected through this process, so that the edge-enhanced image 61 is obtained as shown in FIG. 4C.

The image enlargement processing portion 103 serves to enlarge the edge-enhanced image 61 in accordance with the enlargement ratio specified by the user. Through this process, the edge-enhanced image 61 turns to be the enlarged image 62.

Suppose that, for example, each of the document image 60 and the edge-enhanced image 61 is formed of Px×Py pixels, and the enlargement ratio is α times, where α>1. In such a case, the edge-enhanced image 61 turns to be the enlarged image 62 formed of α·Px×α·Py pixels. For example, when α is 2, the edge-enhanced image 61 turns to be the enlarged image 62 as exemplified in FIG. 5.

The image enlargement processing portion 103 enlarges the edge-enhanced image 61 using a known method to obtain the enlarged image 62. For example, the image enlargement processing portion 103 expands each of the pixels in the edge-enhanced image 61 into a pixel group of α×α pixels. Further, the image enlargement processing portion 103 may perform a process for reducing jaggies in adjacent pixel groups that have undergone the expansion process.

As seen from the comparison between FIG. 4C and FIG. 5, the width of the edge 62e1 of the object in the enlarged image 62 is increased, as shown in FIG. 5, in connection with the enlargement of the edge-enhanced image 61. To cope with this, the edge area re-calculation portion 105 and the edge area correction portion 106 perform a process for reducing the width of the edge 62e1 in the following manner.

The edge area re-calculation portion 105 detects the edge 62e2 of the character in the enlarged image 62 by using the same method as that for detecting the edge 60e of the character in the document image 60 by the edge area determination portion 101. In this way, the use of the same method makes the width of the edge 62e2 equal to that of the edge 60e.

Alternatively, the edge area re-calculation portion 105 detects the edge 62e2 in the following manner. As shown in FIG. 6, the edge 62e1 is divided into two parts along the length direction thereof. The division ratio is set to (α−1):1, where (α−1) is a value for an inner part of the edge 62e1 extending inwardly to the character, and 1 is a value for an outer part extending outwardly to the edge of the character. Here, "α" is the enlargement ratio mentioned earlier applied for enlarging the document image 60 to obtain the edge-enhanced image 61. The edge area re-calculation portion 105 can specify the position of the edge 62e1 in the enlarged image 62 based on the edge area data 7E and the enlargement ratio α. In the case where, for example, the edge area data 7E indicates (Ex, Ey) as the coordinates of a certain pixel in the edge 60e, the coordinates of a pixel in the edge 62e2 corresponding to the certain pixel is (α·Ex, α·Ey), and the vicinity thereof. Note that, if a process for reducing jaggies or the like is performed in the case of enlarging the edge-enhanced image 61 to obtain the enlarged image 62, the edge area re-calculation portion 105 detects the position of the edge 62e1, taking account of the fact that the jaggies reduction process has been performed.

The edge area re-calculation portion 105 defines, as the edge 62e2, the outer part of the two parts obtained by dividing the edge 62e1 as discussed above.

The edge area correction portion 106 performs a process for thinning down the edge 62e1 of the character in the enlarged image 62 in the following manner based on the edge 62e2 detected by the edge area re-calculation portion 105.

The edge area correction portion 106 overlaps the edge 62e1 and the edge 62e2 in such a manner that corresponding pixels in the former and the latter match each other. The edge area correction portion 106, then, selects a part of the edge 62e1 that does not overlap with the edge 62e2. The selected part is a part expanded by enlarging the edge-enhanced image 61 to obtain the enlarged image 62. Hereinafter, the part is referred to as an "expanded area 62b".

The edge area correction portion 106, further, applies an M×N filter to the individual pixels in the expanded area 62b. The M×N filter is used as follows.

The edge area correction portion 106 deems a target pixel to which the M×N filter is to be applied as a "pixel of interest". The edge area correction portion 106 aligns the center of the M×N filter with the pixel of interest. This leads the M×N filter to be applied not only to the pixel of interest but also to (M×N−1) pixels therearound.

The edge area correction portion 106 selects a pixel having the lowest lightness from among the pixel of interest and the (M×N−1) neighboring pixels. In the case where, for example, a 5×5 filter is used as the M×N filter as shown in FIG. 7, the edge area correction portion 106 selects a pixel having the lowest lightness from among the pixel of interest and the 24 neighboring pixels.

The edge area correction portion 106, then, replaces the individual values of the pixel of interest with the individual values of the selected pixel. In the case where, for example, an additive color space is used as a color space, the edge area correction portion 106 replaces the values of red (R), green (G), and blue (B) of the pixel of interest with the values of RGB of the selected pixel.

The edge area correction portion 106 performs the process as discussed above with each of the pixels in the expanded area 62b deemed as the pixel of interest, thereby to make the edge 62e1 thinner. As a result, the edge 62e1 of the character in the enlarged image 62 shown in FIG. 5 is reduced to the edge 62e1 of the character in the corrected enlarged image 63 as shown in FIG. 8. The comparison between FIG. 9 and FIG. 10 shows that gray levels of the individual colors of the expanded area 62b in the edge 62e1 are replaced with gray levels of the colors of the pixels arranged in an inner area of the character.

The enlarged image 62 that has undergone the process for correcting the edge 62e1, as shown in FIG. 8, by the edge area correction portion 106 is hereinafter referred to as a "corrected enlarged image 63". Through the process described above, image data 73 of the corrected enlarged image 63 is generated based on the image data 70.

It is also possible that the edge area correction portion 106 selects a pixel having the highest density from among the pixel of interest and the (M×N−1) neighboring pixels.

The edge area correction portion 106 sends the generated image data 73 to the various output means. For example, the image data 73 is sent to the printer unit log which, in turn, prints the corrected enlarged image 63 onto paper. Alternatively, the image data 73 is transmitted to the personal computer 2 or the like by the NIC 10f via the communication line 3.

[Case for Improving Resolution]

The foregoing description is provided of the example in which the document image 60 as shown in FIG. 4A is enlarged α times. The present invention is also applicable to a case where a resolution rather than the size of an image is increased. This is because the number of pixels of the document image 60 is increased from Px×Py to α·Px×α·Py, also in the case of increasing a resolution of the document image 60 α times with the size thereof unchanged.

[Reuse of Image Data 70 and Edge Area Data 7E]

The image data 70 and the edge area data 7E of the document image 60 are stored in the data storage portion 104 shown in FIG. 3 as described above. It is possible to reuse the image data 70 and the edge area data 7E. For the reuse thereof, a user can specify the enlargement ratio again.

Suppose that, for example, the user specifies β times as the enlargement ratio, where β>0, and, at the same time, β≠α. Responding to this operation, the edge enhancement processing portion 102 of FIG. 3 performs a process for enhancing an edge of a character contained in the document image 60 based on the edge area data 7E. Through the process, an edge-enhanced image 61 is obtained. The image enlargement processing portion 103 uses the enlargement ratio β instead of the enlargement ratio α to enlarge the edge-enhanced image 61; thereby to obtain an enlarged image 62. The edge area re-calculation portion 105 uses, if necessary, the enlargement ratio β instead of the enlargement ratio α to detect an edge 62e2. The edge area correction portion 106 performs a process for making an edge 62e1 thinner based on the edge 62e2. Thereby, image data 73 of the corrected enlarged image 63 is obtained.

[Edge Correction on Image Having Already Undergone Image Processing]

Figure 11:
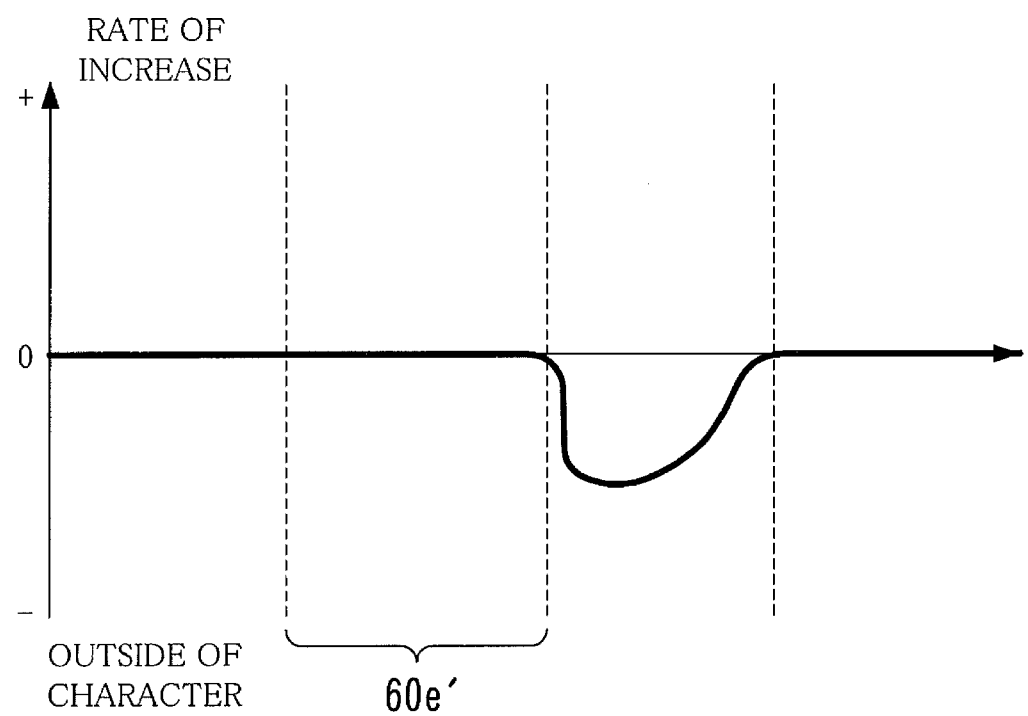
FIG. 11 is a diagram illustrating an example of a rate of increase for a case where density of an edge and its vicinity is corrected.
Figure 12:
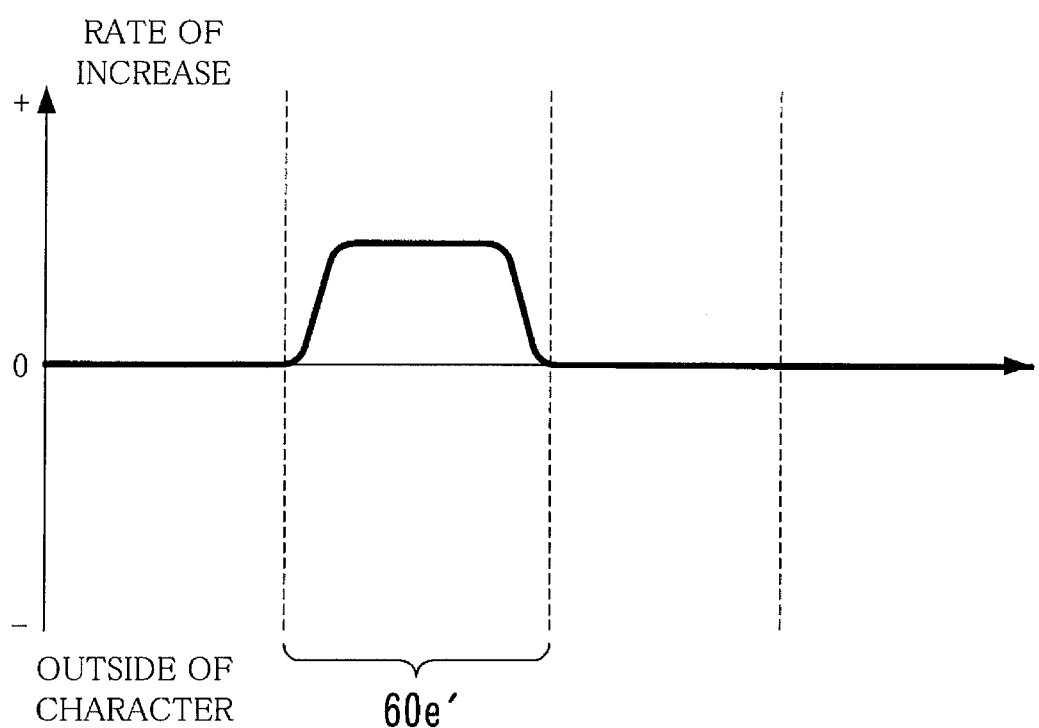
FIG. 12 is a diagram illustrating a modification of a rate of increase for a case where density of an edge and its vicinity is corrected.

FIG. 11 is a diagram illustrating an example of a rate of increase for a case where density of an edge 60e' and its vicinity is corrected; and FIG. 12 is a diagram illustrating a modification of a rate of increase for a case where density of the edge 60e' and its vicinity is corrected.

There is a case where the image forming apparatus 1 obtains, instead of a document image 60, a document image 60' that has already been subjected to certain image processing. In such a case, the image forming apparatus 1 may perform a process on the document image 60' in the following manner.

In the case where, for example, an image that has been subjected to edge enhancement is obtained as the document image 60', the edge area re-calculation portion 105 and the edge area correction portion 106 of the image forming apparatus 1 perform the following process instead of the process using the M×N filter as shown in FIG. 7.

The edge area re-calculation portion 105 detects the edge 60e' of a character in the document image 60' in a manner similar to that for detection of the edge 60e by the edge area determination portion 101. As shown in FIG. 11, the edge area correction portion 106 reduces the density of the individual pixels arranged in an area extending from the edge 60e' to the center of the character by a proportion depending on the distance away from the edge 60e'.

On the other hand, in the case where, for example, an image that has not been subjected to edge enhancement is obtained as the document image 60', the edge area re-calculation portion 105 and the edge area correction portion 106 of the image forming apparatus 1 perform the following process instead of the process using the M×N filter as shown in FIG. 7.

The edge area re-calculation portion 105 detects the edge 60e' of a character in the document image 60' in a manner similar to that for detection of the edge 60e by the edge area determination portion 101. As shown in FIG. 12, the edge area correction portion 106 reduces the density of the individual pixels in the edge 60e' by a proportion depending on the distance away from the outside of the character. This method is also effective for a case where an image that has been subjected to a reduction process in size is obtained as the document image 60'.

FIG. 13 is a flowchart depicting an example of the overall processing flow of the image forming apparatus 1.

The following is a description of the overall processing for a case where the image forming apparatus 1 corrects an edge of a character in an image, with reference to the flowchart of FIG. 13.

The image forming apparatus 1 receives an enlargement ratio or an output resolution as conditions for image output (#11 of FIG. 13).

If the image forming apparatus 1 does not have edge area data 7E and the like of an image that is the output target (No in #12), then the image forming apparatus 1 scans an image depicted on paper, or performs communication with the personal computer 2; thereby to obtain image data 70 of the image (#13). The image forming apparatus 1, then, detects the position of an edge of the image based on the obtained image data 70, and generates edge area data 7E (#14). Subsequently, the image forming apparatus 1 saves, therein, the image data 70, the edge area data 7E, and attribute data 7A indicating a resolution of the image and the number of pixels thereof (#15).

On the other hand, if the image forming apparatus 1 already saves, therein, edge area data 7E, attribute data 7A, and image data 70 of an image that is the output target (Yes in #12), then the image forming apparatus 1 reads out the these pieces of the data therefrom (#16).

The image forming apparatus 1 uses the data obtained through Steps #13 and #14, or the data obtained in Step #16 to perform the following process.

The image forming apparatus 1 enlarges or reduces the original image, or, alternatively, changes a resolution of the original image based on the image data 70 (#17). Through this process, the size or a resolution of an image as the output target is adjusted. The image forming apparatus 1 extracts an edge of a character from the resultant image (#18). The image forming apparatus 1, then, uses the M×N filter or the like to perform correction on pixels in the extracted edge and pixels therearound (#19). Thereby, an intended image is obtained.

Subsequently, the image forming apparatus 1 prints the obtained image onto paper, or transmits the obtained image in the form of image data (#20).

The embodiment discussed above makes it possible to improve the appearance of an edge of an object in an enlarged image or in an image whose resolution has been increased, as compared to conventional technologies. The embodiment also makes it possible to appropriately correct an edge not only in a second generation duplicate but also in a third generation duplicate and beyond. The third generation duplicate and beyond means a duplicate obtained as a result of repetition of the copy process.

In this embodiment, the description is provided of the example in which edge correction is performed on a character. The present invention is also applicable to a case in which edge correction is performed on an object other than a character, e.g., illustration and chart.

In the embodiments discussed above, the overall configuration of the image forming apparatus 1, the configurations of various portions thereof, the content to be processed, the processing order, the structure of the M×N filter, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
a storage portion that stores, therein, edge position data indicating a position of a first edge image, the first edge image representing a first edge area of a first object image, the first object image representing an object contained in a first image;
a determination portion that detects, based on the edge position data and a specific scaling factor which is greater than 1, a second edge image representing a second edge area having a width equal to a width of the first edge area from an outer periphery of an edge area of a second object image, the second object image representing the object contained in a second image, the second image being an image obtained by modifying a size or a resolution of the first image by increasing a number of pixels by the specific scaling factor; and
an edge removal portion that performs a process for deleting an edge of an inner area that is a part other than the second edge image of the edge area of the second object image.

2. The image processing apparatus according to claim 1, wherein the edge removal portion performs the process for deleting an edge by changing attributes of colors of each pixel in the inner area to attributes of colors of a pixel having a lowest lightness value among all pixels in a predetermined region with said each pixel centered.

3. The image processing apparatus according to claim 2, wherein the edge removal portion performs the process for deleting an edge by correcting attributes of colors of each pixel in the inner area in such a manner that a pixel closer to the second edge image has attributes approximated to attributes of a color of the second edge image, and a pixel farther from the second edge image has attributes approximated to attributes of colors of pixels surrounded by the inner area.

4. An image processing method comprising:
storing, in a storage portion, edge position data indicating a position of a first edge image, the first edge image representing a first edge area of a first object image, the first object image representing an object contained in a first image;
detecting, based on the edge position data and a specific scaling factor which is greater than 1, a second edge image representing a second edge area having a width equal to a width of the first edge area from an outer periphery of an edge area of a second object image, the second object image representing the object contained in a second image, the second image being an image obtained by modifying a size or a resolution of the first image by increasing a number of pixels by the specific scaling factor; and
performing a process for deleting an edge of an inner area that is a part other than the second edge image of the edge area of the second object image.

5. A non-transitory computer-readable storage medium storing thereon a computer program used in a computer for performing image processing, the computer program causing the computer to perform:
processing for storing, in a storage portion, edge position data indicating a position of a first edge image, the first edge image representing a first edge area of a first object image, the first object image representing an object contained in a first image;
processing for detecting, based on the edge position data and a specific scaling factor which is greater than 1, a second edge image representing a second edge area having a width equal to a width of the first edge area from an outer periphery of an edge area of a second object image, the second object image representing the object contained in a second image, the second image being an image obtained by modifying a size or a resolution of the first image by increasing a number of pixels by the specific scaling factor; and
processing for deleting an edge of an inner area that is a part other than the second edge image of the edge area of the second object image.

* * * * *